(12) United States Patent
Houchin-Miller et al.

(10) Patent No.: US 7,871,719 B2
(45) Date of Patent: Jan. 18, 2011

(54) BATTERY MODULE INCLUDING ELECTROCHEMICAL CELL WITH PRESSURE RELIEF FEATURE

(75) Inventors: Gary P. Houchin-Miller, Fox Point, WI (US); Dale B. Trester, Milwaukee, WI (US); Steven J. Wood, Shorewood, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 12/252,008

(22) Filed: Oct. 15, 2008

(65) Prior Publication Data

US 2009/0042094 A1 Feb. 12, 2009

Related U.S. Application Data

(63) Continuation of application No. PCT/US2007/010012, filed on Apr. 26, 2007.

(60) Provisional application No. 60/795,818, filed on Apr. 28, 2006, provisional application No. 60/808,386, filed on May 25, 2006.

(51) Int. Cl.
H01M 2/12 (2006.01)
(52) U.S. Cl. .............................. 429/56; 429/53; 429/65
(58) Field of Classification Search .................. 429/65, 429/53, 61, 56
See application file for complete search history.

(56) References Cited

U.S. PATENT DOCUMENTS 2,525,436 A 10/1950 Williams, Jr.
3,285,784 A 11/1966 Babusci et al.
3,741,812 A 6/1973 Spellman et al.

(Continued)

FOREIGN PATENT DOCUMENTS

JP 2007-012485 1/2007

(Continued)

OTHER PUBLICATIONS

International Preliminary Report on Patentability, International Search Report and Written Opinion of the International Searching Authority for International Application No. PCT/US2007/010012; date of mailing May 29, 2008; 16 pages.

(Continued)

*Primary Examiner*—Dah-Wei D Yuan
*Assistant Examiner*—Zachary Best
(74) *Attorney, Agent, or Firm*—Foley & Lardner LLP (57) ABSTRACT

A battery module includes at least one electrochemical cell. The electrochemical cell includes a first terminal conductively coupled to a first electrode and a body portion configured to function as a second terminal and conductively coupled to a second electrode via a pressure relief portion. The battery module further includes an end cap comprising a conductive portion and an insulating portion, the conductive portion being conductively coupled to the body portion. The pressure relief portion is configured to separate from the body portion to a deployed position when a pressure within the body portion reaches a first predetermined level, thereby substantially breaking the conductive coupling between the body portion and the second electrode. The insulating portion substantially prevents formation of a conductive coupling between the body portion and the second electrode when the pressure relief portion is in the deployed position.

17 Claims, 6 Drawing Sheets

U.S. PATENT DOCUMENTS

| | | | |
|---|---|---|---|
| 3,787,243 A | | 1/1974 | Zaleski |
| 3,923,549 A | | 12/1975 | Mabuchi et al. |
| 4,505,993 A | | 3/1985 | Skinner |
| 4,628,012 A | | 12/1986 | Spahrbier |
| 5,654,114 A | * | 8/1997 | Kubota et al. ............... 429/338 |
| 5,900,332 A | | 5/1999 | Marukawa et al. |
| 6,004,687 A | | 12/1999 | Iwaki et al. |
| 6,287,150 B1 | | 9/2001 | Oda et al. |
| 6,296,970 B1 | | 10/2001 | Killebrew et al. |
| 6,346,342 B1 | | 2/2002 | Li |
| 6,599,660 B2 | | 7/2003 | Oda et al. |
| 6,632,558 B1 | | 10/2003 | Sondecker et al. |
| 6,632,562 B1 | | 10/2003 | Nakatsuka et al. |
| 6,673,485 B2 | | 1/2004 | Kimura et al. |
| 7,056,618 B2 | | 6/2006 | Hirano et al. |
| 2002/0081483 A1 | * | 6/2002 | Nemoto et al. ................ 429/53 |
| 2004/0101747 A1 | | 5/2004 | Bushong et al. |
| 2004/0241536 A1 | * | 12/2004 | Kim ............................ 429/65 |
| 2005/0214634 A1 | | 9/2005 | Kim |
| 2005/0244706 A1 | | 11/2005 | Wu et al. |

FOREIGN PATENT DOCUMENTS

| | | |
|---|---|---|
| JP | 2007-012486 | 1/2007 |
| JP | 2007-012487 | 1/2007 |

OTHER PUBLICATIONS

International Search Report and Written Opinion for International Application No. PCT/US2007/010012; mailing date May 29, 2008; 10 pages.

Office Action for European Application No. 07756007.6, dated Dec. 21, 2009, 3 pages.

Response to Office Action for European Application No. 07756007.6, dated Apr. 21, 2010, 12 pages.

Office Action for Chinese Application No. 200780015495.3 with English translation, dated Apr. 14, 2010, 5 pages.

* cited by examiner

(12) United States Patent
US 7,871,719 B2

BATTERY MODULE INCLUDING ELECTROCHEMICAL CELL WITH PRESSURE RELIEF FEATURE

CROSS-REFERENCE TO RELATED PATENT APPLICATIONS

This application is a Continuation of International Patent Application PCT/US2007/010012, filed Apr. 26, 2007, which claims the benefit of and priority to U.S. Provisional Patent Application No. 60/795,818, filed Apr. 28, 2006 and U.S. Provisional Patent Application No. 60/808,386, filed May 25, 2006. International Patent Application PCT/US2007/010012, U.S. Provisional Patent Application No. 60/795,818 and U.S. Provisional Patent Application No. 60/808,386 are incorporated herein by reference in their entirety.

BACKGROUND

The present inventions relate generally to a battery module assembly. The present inventions relate more particularly to a battery module assembly having a break-away vent portion that is deployable in the event of an over-pressure condition within the battery. The present inventions also relate to a battery module assembly having a containment structure configured to receive a break-away vent portion and permit gases to escape.

Battery modules for use in vehicles and other suitable applications are generally known. However, such known battery modules tend to have certain disadvantages. For example, known battery modules typically include a first battery cell coupled directly to a second battery cell and do not generally provide a containment structure configured to accommodate a break-away vent portion that permits gases to escape in the event of over-pressure conditions within a battery cell.

Accordingly, it would be desirable to provide a battery module assembly having a containment structure configured to accommodate a break-away vent portion and permit gases to escape in the event of over-pressure conditions within a battery cell, or any other advantageous features.

SUMMARY

According to one embodiment, a battery module includes at least one electrochemical cell. The electrochemical cell includes a first terminal conductively coupled to a first electrode and a body portion configured to function as a second terminal and conductively coupled to a second electrode via a pressure relief portion. The battery module further includes an end cap comprising a conductive portion and an insulating portion, the conductive portion being conductively coupled to the body portion. The pressure relief portion is configured to separate from the body portion to a deployed position when a pressure within the body portion reaches a first predetermined level, thereby substantially breaking the conductive coupling between the body portion and the second electrode. The insulating portion substantially prevents formation of a conductive coupling between the body portion and the second electrode when the pressure relief portion is in the deployed position.

According to another embodiment, a battery module assembly includes a plurality of electrochemical cells coupled together. Each electrochemical cell includes a first terminal electrically coupled to a first electrode and a body that is electrically coupled to a second electrode by a pressure relief mechanism and is configured to act as a second terminal. The battery module further includes a member having a conductive portion and an insulating portion. The conductive portion is coupled to a body portion of a first electrochemical cell and to a first terminal of a second electrochemical cell. The member is configured to maintain contact with the first electrochemical cell and the first terminal of the second electrochemical cell when the pressure relief mechanism deploys.

According to another embodiment, a battery module includes at least one electrochemical cell. The electrochemical cell includes a first terminal conductively coupled to a first electrode and a body configured to function as a second terminal and conductively coupled to a second electrode by a first pressure relief member. The battery module also includes a second pressure relief member coupled to the body. The first pressure relief member is configured to separate from the body to a deployed position when a pressure within the body reaches a first predetermined level to break the conductive coupling between the body and the second electrode. The second pressure relief member is configured to separate from the body to a deployed position when a pressure within the body reaches a second predetermined level higher than the first predetermined level to permit fluids to escape from the body.

DETAILED DESCRIPTION

Figures 1, 2:
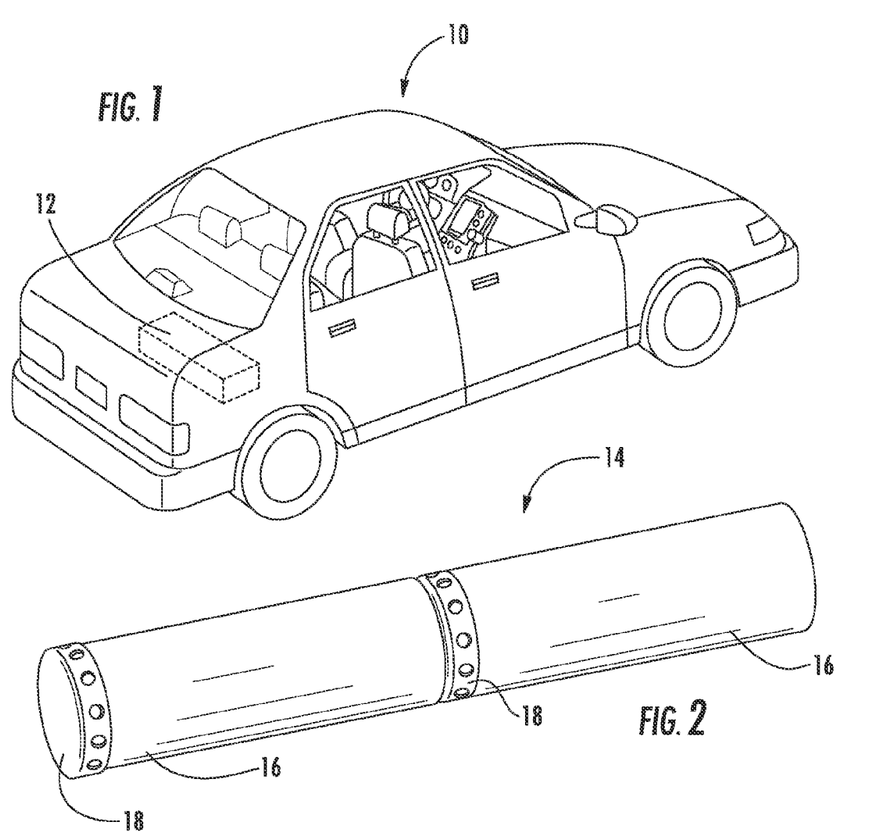
FIG. 1 is an isometric view of a vehicle having a battery assembly according to an exemplary embodiment.
FIG. 2 is an isometric view of a battery module assembly according to an exemplary embodiment.

Referring to FIG. 1, a vehicle 10 is shown according to an exemplary embodiment and includes a battery system 12. While vehicle 10 is shown as an automobile, according to various alternative embodiments, vehicle 10 may comprise a wide variety of differing types of vehicles including, among others, motorcycles, buses, recreational vehicles, boats, and the like. Battery system 12 is configured to provide at least a portion of the power required to operate vehicle 10. Further, it should be understood that according to various alternative embodiments, battery system 12 may be utilized in a variety of applications not involving a vehicle such as vehicle 10, and all such applications are intended to be within the scope of the present disclosure.

Referring to FIGS. 1-2, according to an exemplary embodiment, battery system 12 includes one or more battery module assemblies or battery modules 14. Battery module 14 comprises a plurality of batteries or cells 16 (e.g., electrochemical cells such as lithium-ion cells, lithium polymer cells, or cells utilizing any suitable chemistry now known or hereafter developed) and a plurality of end caps 18. Battery module 14 is configured to store and deliver an electrical charge (e.g., to a gasoline-electric hybrid vehicle, etc.). Cells 16 of battery module 14 may be used in any suitable application and the scope of the embodiments described herein are intended to include all such applications.

Figure 4:
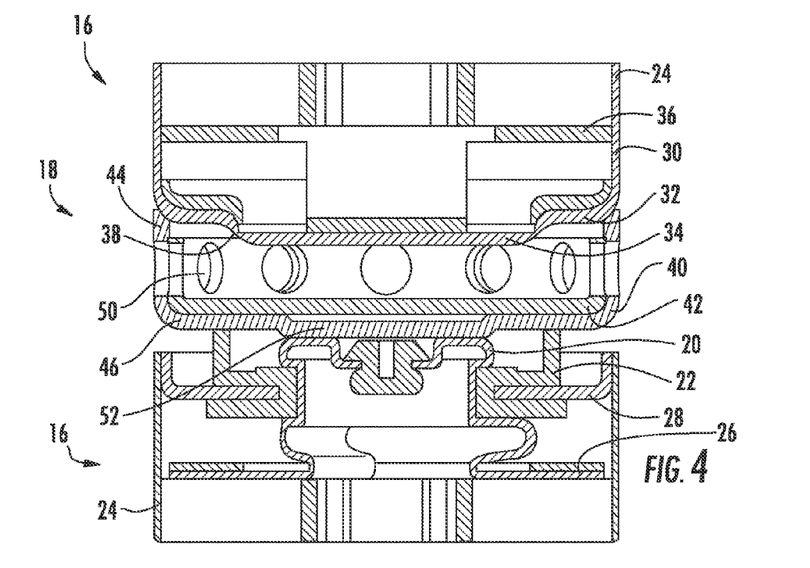
FIG. 4 is a cross-sectional view of a portion of the battery module assembly of FIG. 1 according to an exemplary embodiment.

As shown in FIGS. 2 and 4, cells 16 are shown as generally cylindrical bodies comprising a first terminal 20, an insulator 22, and a body or can 24 that is configured to act as a second terminal. First terminal 20 is shown provided on one end of cell 16. First terminal 20 is conductively coupled to a first electrode 26 of cell 16. According to an exemplary embodiment, first terminal 20 has a generally cylindrical body that extends outward from end face 28 of cell 16. Insulator 22 at least partially surrounds first terminal 20 and is configured to substantially electrically insulate first terminal 20 from can 24 (e.g., the second terminal). Can 24 is shown to comprise a generally cylindrical side wall 30, an end wall 32, and a vent 34, and is configured to surround and contain various interior components of cell 16 (e.g., electrodes, electrolyte, etc).

In an exemplary embodiment, can 24 is conductively coupled to a second electrode 36 in cell 16 and is configured to act as the second terminal of cell 16. End wall 32 of can 24 includes a pressure relief region that is shown as a generally annular body intended to provide a safety feature in the form of vent 34 (e.g., a pressure relief device or region, etc.). End wall 32 is shown, for example, as a single unitary body with vent 34 and has a thickness that is reduced to provide a weakened area 38 surrounding vent 34. According to alternative embodiments, the weakened area may be provided by "scoring" or other suitable methods of weakening the material of end wall 32, or may be a separate material provided with end wall 32.

According to an exemplary embodiment, vent 34 and weakened area 38 provide a pressure relief mechanism for cell 16. For example, if cell 16 malfunctions, gases may build up within can 24 and result in an increased pressure condition. Vent 34 is configured to deploy by "breaking away" from end wall 32 at weakened area 38 if cell 16 malfunctions and the pressure inside can 24 increases above a predetermined point. Vent 34 (in its pre-deployment position) is configured to complete a conductive path between second electrode 36 of cell 16 and can 24 such that can 24 acts as a second terminal for cell 16. When vent 34 deploys (i.e. "breaks away") from end wall 32 of can 24, the conductive path is interrupted or broken.

Figure 3:
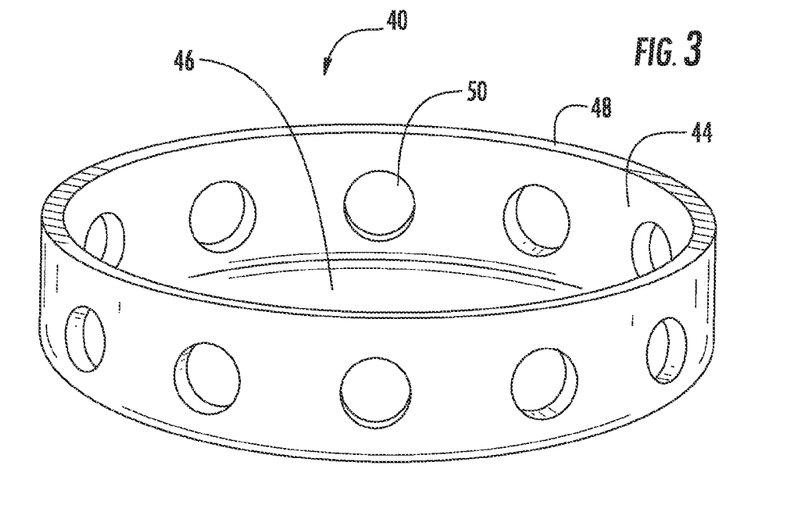
FIG. 3 is an isometric view of a portion of an end cap from the battery module assembly of FIG. 2 according to an exemplary embodiment.
Figure 5:
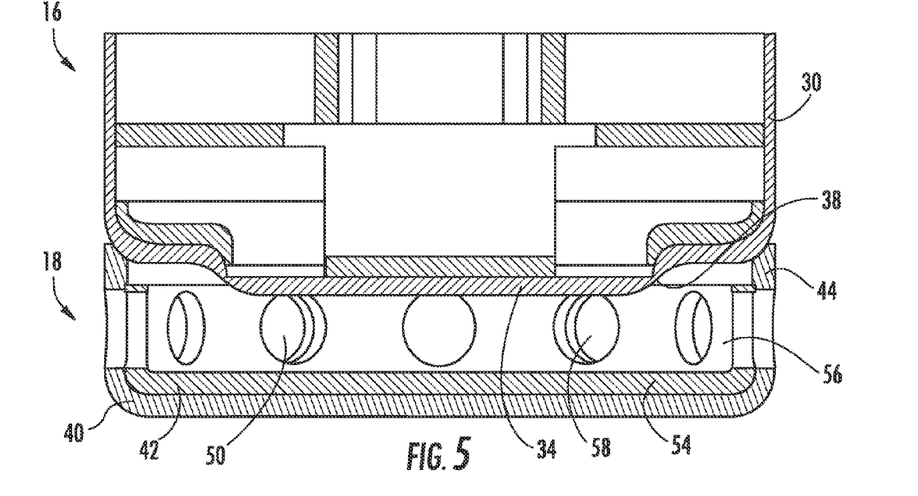
FIG. 5 is a cross-sectional view of a portion of the battery module assembly of FIG. 4 according to another exemplary embodiment.

Referring now in particular to FIGS. 3-5, end cap 18, according to an exemplary embodiment, is shown in more detail. End cap 18 is configured to be located between a first cell and a second cell (e.g., as shown between two cells 16 in FIG. 4). As shown in FIGS. 3 and 4, end cap 18 is configured to allow a first cell 16 to be coupled electrically and mechanically to a second cell 16 via end cap 18. Further, end cap 18 permits vent 34 to break away from end wall 32 and remain contained within end cap 18 if the pressure inside cell 16 exceeds a predetermined level.

End cap 18 comprises a conductive portion 40 and an insulating portion 42. According to an exemplary embodiment, conductive portion 40 is aluminum and insulating portion 42 is polypropylene. According to other exemplary embodiments, conductive portion 40 may be any material that suitably conducts electricity and insulating portion 42 may be any material that is a suitable insulator.

Conductive portion 40 is shown to comprise a generally cylindrical side wall 44 and a generally circular end wall 46. Side wall 44 comprises a rim 48 and includes one or more apertures 50. According to one embodiment, side wall 44 of conductive portion 40 has a diameter that is generally the same as the diameter of side wall 30 of cell 16. According to various other embodiments, side wall 44 may have a larger or smaller diameter. Rim 48 of conductive portion 40 is coupled to can 24 of cell 16. According to an exemplary embodiment, conductive portion 40 is welded to can 24 (e.g., by laser welding). According to other embodiments, conductive portion 40 may be coupled to can 24 in any other suitable manner that mechanically and electrically couples conductive portion 40 to can 24. Side wall 44 of conductive portion 40 forms one or more apertures 50, shown as a series of generally round holes. According to one embodiment, apertures 50 are provided to allow gases to escape from the interior of can 24 if vent 34 breaks away from end wall 32. In other exemplary embodiments, the size, shape, and/or spacing of apertures 50 may be varied to control the rate gases escape, to interface with another component to contain or dispose of the gases, etc.

End wall 46 of conductive portion 40 is conductively coupled to body portion or can 24 of cell 16. According to one exemplary embodiment, end wall 46 includes a raised portion 52 that is configured to interface with a first terminal 20 of an adjacent cell (see, e.g., FIG. 4). According to other exemplary embodiments, raised portion 52 may be more or less pronounced than illustrated, or alternatively, may be absent from end wall 46 (see, e.g. FIG. 5). According to one embodiment, insulating portion 42 is included generally inside conductive portion 40. According to one embodiment, the shape of insulating portion 42 is substantially similar to the shape of conductive portion 40, in that insulating portion 42 has an end wall 54, a side wall 56, and a plurality of apertures 58 that generally correspond with apertures 50 in conductive portion 40.

According to one embodiment, insulating portion 42 is configured to prevent vent 34 from establishing or completing a conductive path between second electrode 36 and conductive portion 40 in the event that vent 34 only partially breaks away from end wall 32 of cell 16.

Figure 6:
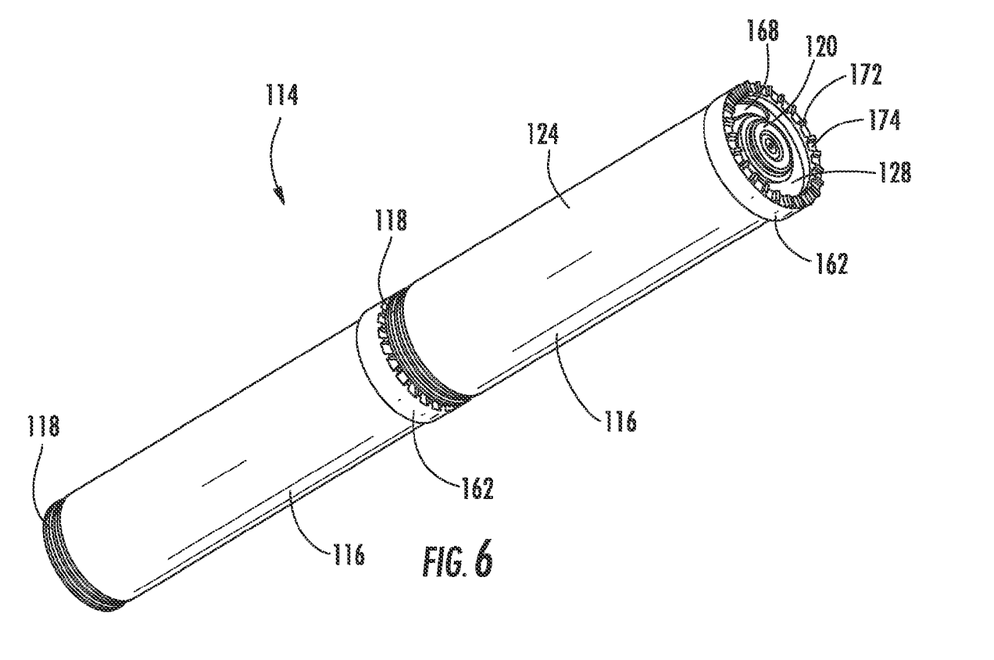
FIG. 6 is an isometric view of a battery module assembly according to another exemplary embodiment.
Figure 7:
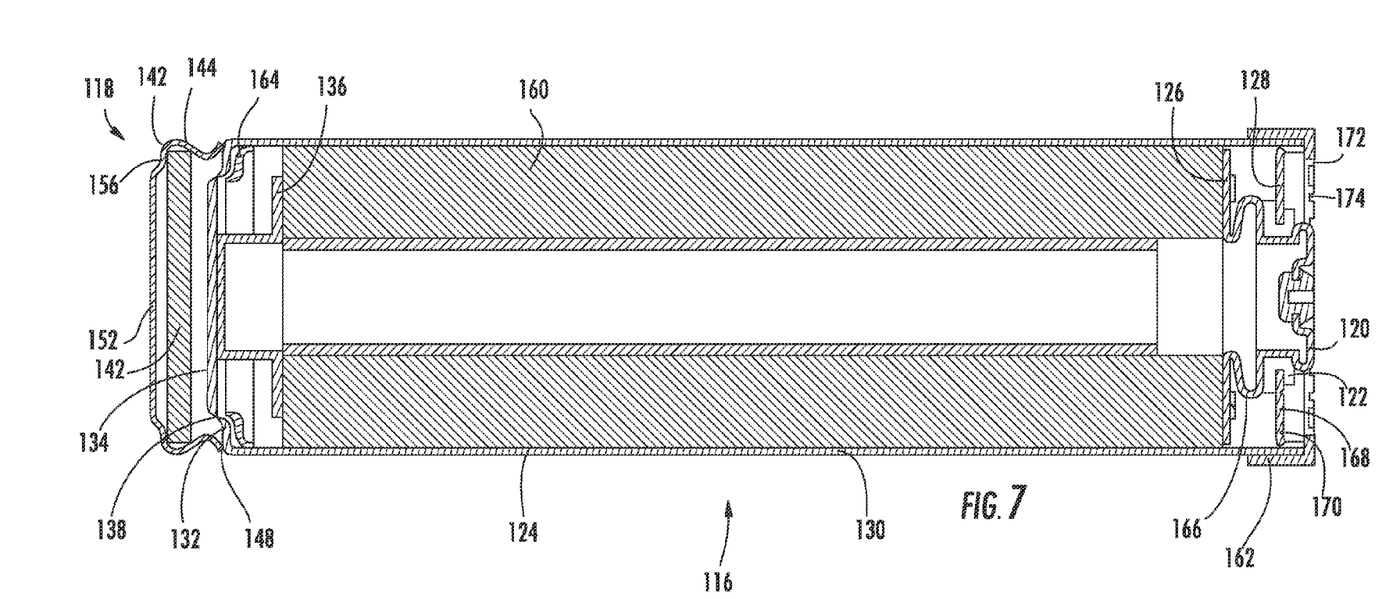
FIG. 7 is a cross-section of a portion of the battery module assembly shown in FIG. 6 according to an exemplary embodiment.
Figure 8:
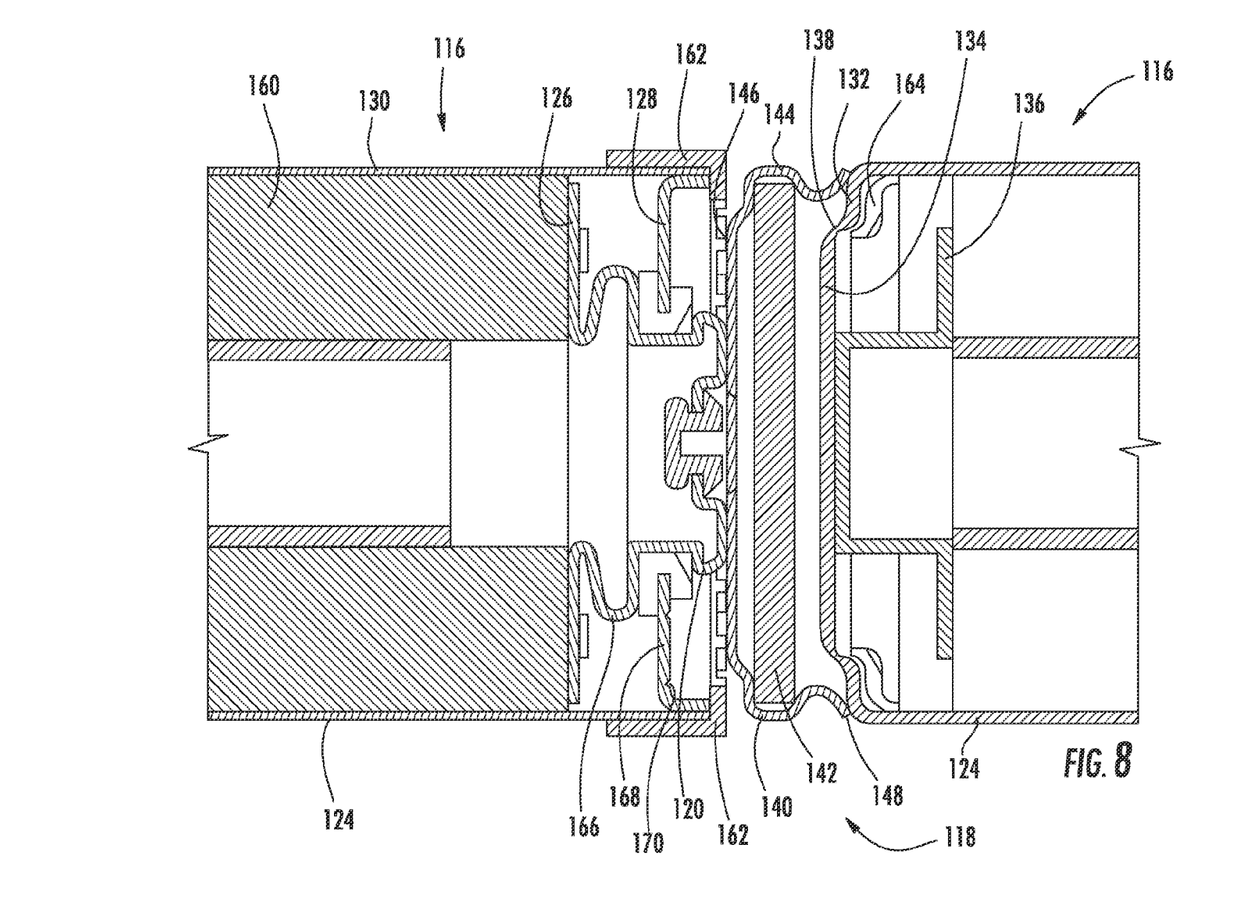
FIG. 8 is a cross-sectional view of a portion of the battery module assembly shown in FIG. 6 according to an exemplary embodiment.

Referring now to FIGS. 6-8, various portions of a battery module 114 are shown according to another exemplary embodiment that provides a two-stage pressure relief system. Battery module 114 comprises a plurality of cells 116 and a plurality of end caps 118. Battery module 114 is configured to store and deliver an electrical charge (e.g., to a gasoline-electric hybrid vehicle, etc.). Cells 116 and battery module 114 may be used in many other suitable applications and the scope of the embodiments described herein are intended to include all such applications.

As shown in FIGS. 6 and 7, cells 116 are shown as generally cylindrical bodies comprising a first terminal 120, a first insulator 122, a body or can 124 that is configured to act as a second terminal, a lid 128 and an insulator cap 162. As shown in FIGS. 7 and 8, the interior of cell 116 comprises at least an electrode roll 160, a first electrode 126, a second electrode 136, and a second insulator 164. Body 124 is shown as a thin-walled body comprising a generally cylindrical side wall 130, an end wall 132, and a vent 134, and is configured to surround and contain the interior components of cell 116 (e.g., electrodes, electrolyte, etc.).

First terminal 120 is shown provided on one end of cell 116. First terminal 120 includes an extending portion 166 that is conductively coupled to first electrode 126 in cell 116. According to one exemplary embodiment, first terminal 120 is a generally cylindrical body that extends outward from end face or lid 128. First insulator 122 at least partially surrounds first terminal 120 and is configured to substantially electrically insulate first terminal 120 from body 124. According to an exemplary embodiment, first insulator 122 is polythermide. According to other exemplary embodiments, first insulator 122 may be another polymer or any other material that sufficiently insulates first terminal 120.

Lid 128 is a thin annular body that substantially surrounds first insulator 122 and is coupled to the end of body 124 opposite end wall 132. According to an exemplary embodiment, lid 128 includes a vent portion 168 surrounded by a groove 170. Lid 128 is shown for example as a single unitary body with vent portion 168 and has a thickness that is reduced at groove 170 to provide a weakened area surrounding vent portion 168. According to an exemplary embodiment, groove 170 (e.g., a channel, hollow, notch, score, etc.) has a generally v-shaped cross-section. According to other exemplary embodiments, groove 170 may have a different cross-section (e.g., u-shaped, square, etc.). According to still alternative embodiments, weakened area or groove 170 may be provided by other suitable methods of weakening the material of lid 128, or may be a separate material provided with lid 128.

Insulator cap 162 is provided at one end of a first cell 116 and is configured to conductively insulate body 124 of a first cell 116 from an end cap 118 coupled to a second cell 116. Insulator cap 162 comprises a plurality of radially arranged ridges 172 (e.g., raised portions, etc.) separated by channels 174 (e.g. depressed portions, etc.). According to other exemplary embodiments insulator cap 162 may comprise raised portions and depressed portions in other arrangements as long as insulator cap 162 allows fluid communication between the atmosphere and the space between a first cell 116 and a second cell 116. According to an exemplary embodiment, insulator cap 162 is polypropylene. According to other exemplary embodiments, insulator cap 162 may be another polymer or any other material that is a suitable electrical insulator.

According to an exemplary embodiment, cell 116 is a wound cell that includes electrodes that are rolled into a generally cylindrical electrode roll 160. First electrode 126 is coupled to one end of electrode roll 160 and second electrode 136 is coupled to the opposite end of electrode roll 160. According to an exemplary embodiment, first electrode 126 and second electrode 136 are coupled to electrode roll 160 by welding (e.g., laser welding). According to other exemplary embodiments, the coupling may be mechanical in nature or may be any other suitable method that conductively couples electrodes 126, 136 to electrode roll 160.

In an exemplary embodiment, body 124 is conductively coupled to second electrode 136 in cell 116 and is configured to act as the second terminal of cell 116. End wall 132 of body 124 is shown as a generally annular body intended to surround a safety feature in the form of a vent 134 (e.g. a pressure relief device, etc.). End wall 132 is shown, for example, as a single unitary body with vent 134 and has a thickness that is reduced to provide a weakened area 138 surrounding vent 134. According to alternative embodiments, weakened area 138 may be provided by "scoring" or other suitable methods of weakening the material of end wall 132, or may be a separate material provided with end wall 132.

Referring to FIGS. 7 and 8, end cap 118 is shown located between a first cell 116 and a second cell 116. In many typical conventional battery modules, the body of a first cell is coupled directly to the terminal of a second cell. As shown in FIGS. 6-8, end cap 118 of the illustrated embodiment is configured to allow first cell 116 to be coupled electrically and mechanically to second cell 116 via end cap 118. Further, end cap 118 permits vent 134 to break away and remain contained within end cap 118 if the pressure within cell 116 rises above a first threshold pressure.

According to an exemplary embodiment, end cap 118 comprises a conductive member or portion 140 and an insulating member or portion 142. Conductive portion 140 is shown to comprise a side wall 144 and a generally circular end wall 146. According to an exemplary embodiment, side wall 144 of conductive portion 140 may have a diameter that is generally the same as the diameter of side wall 130 of cell 116. Side wall 144 comprises a rim 148 that may be coupled to body 124 of cell 116. According to an exemplary embodiment the conductive portion 140 is welded to body 124. According to other embodiments, conductive portion 140 may be coupled to body 124 in any other suitable manner that mechanically and electrically couples conductive portion 140 to body 124. Side wall 144 may be generally cylindrical and perpendicular to end wall 146 or may be contoured to be more easily welded to body 124. End wall 146 of conductive portion 140 is configured to be coupled to a first terminal 120 of an adjacent cell 116. According to one exemplary embodiment, end wall 146 includes a raised portion 152 (see FIG. 7) that is configured to interface with a first terminal 120 of an adjacent cell 116. According to other exemplary embodiments, raised portion 152 may be more or less pronounced or may be absent. According to an exemplary embodiment, conductive portion 140 is aluminum. According to other exemplary embodiments, conductive portion 140 may be any material that suitably conducts electricity.

Insulating member or element 142 is included inside conductive portion 140. Insulating member 142 is a generally cylindrical body that is configured to fit within conductive portion 140 and has a height generally less than the height of conductive portion 140. According to one embodiment, insulating member 142 is configured to prevent vent 134 from establishing or completing a conductive path between second electrode 136 and conductive portion 140. According to one exemplary embodiment, insulating member 142 is a polyethylene foam. According to other exemplary embodiments, insulating member 142 may be any material that is suitably non-conductive and shock absorbing.

Cell 116 and end cap 118 cooperate to form a two-stage pressure relief system. If cell 116 malfunctions, gases may build up inside body 124 and result in an undesirable increased pressure condition. According to an exemplary embodiment, if the pressure within body 124 rises above a first predetermined threshold pressure (which is approximately 5 bars (0.5 megapascals (MPa)) according to an exemplary embodiment, but may vary according to other exemplary embodiments), extending portion 166 of first terminal 120 allows electrode roll 160 to move within body 124 in a direction generally away from first terminal 120 and push against vent 134. Vent 134 is configured to deploy by "breaking away" from end wall 132 at the point of reduced thickness 138. Vent 134 (in its pre-deployment position) is configured to complete a conductive path between second electrode 136 and body 124 so that when vent 134 deploys (i.e., "breaks away") from end wall 132 of body 124, the conductive path is interrupted or broken. Second insulator 164 is configured to prevent second electrode 136 from completing a conductive path with body 124. Any gases building up in body 124 are allowed to escape into end cap 118. This may lower the internal pressure below the first threshold pressure. Insulating member 142 of end cap 118 is configured to at least partially absorb the momentum of vent 134 as it moves away from body 124 and substantially prevent vent 134 from bouncing off end cap 118 and reestablishing a conductive path with end wall 132.

If the internal pressure within body 124 continues to rise and increases above a second predetermined threshold pressure (which is approximately 10 bars (1 MPa)) according to an exemplary embodiment, but may vary according to other exemplary embodiments), vent portion 168 (see FIG. 7) is configured to deploy by "breaking away" from lid 128 at groove 170. Vent portion 168 allows internal gases to escape body 124 into the atmosphere through channels 174 in insulator cap 162. In this manner, a system is employed: in the first stage, pressure buildup causes electrical disconnection of cell 116 (e.g., as a result of vent 134 deploying); in the second stage, gases are vented to the atmosphere (e.g., as a result of vent portion 168 deploying).

Figure 9:
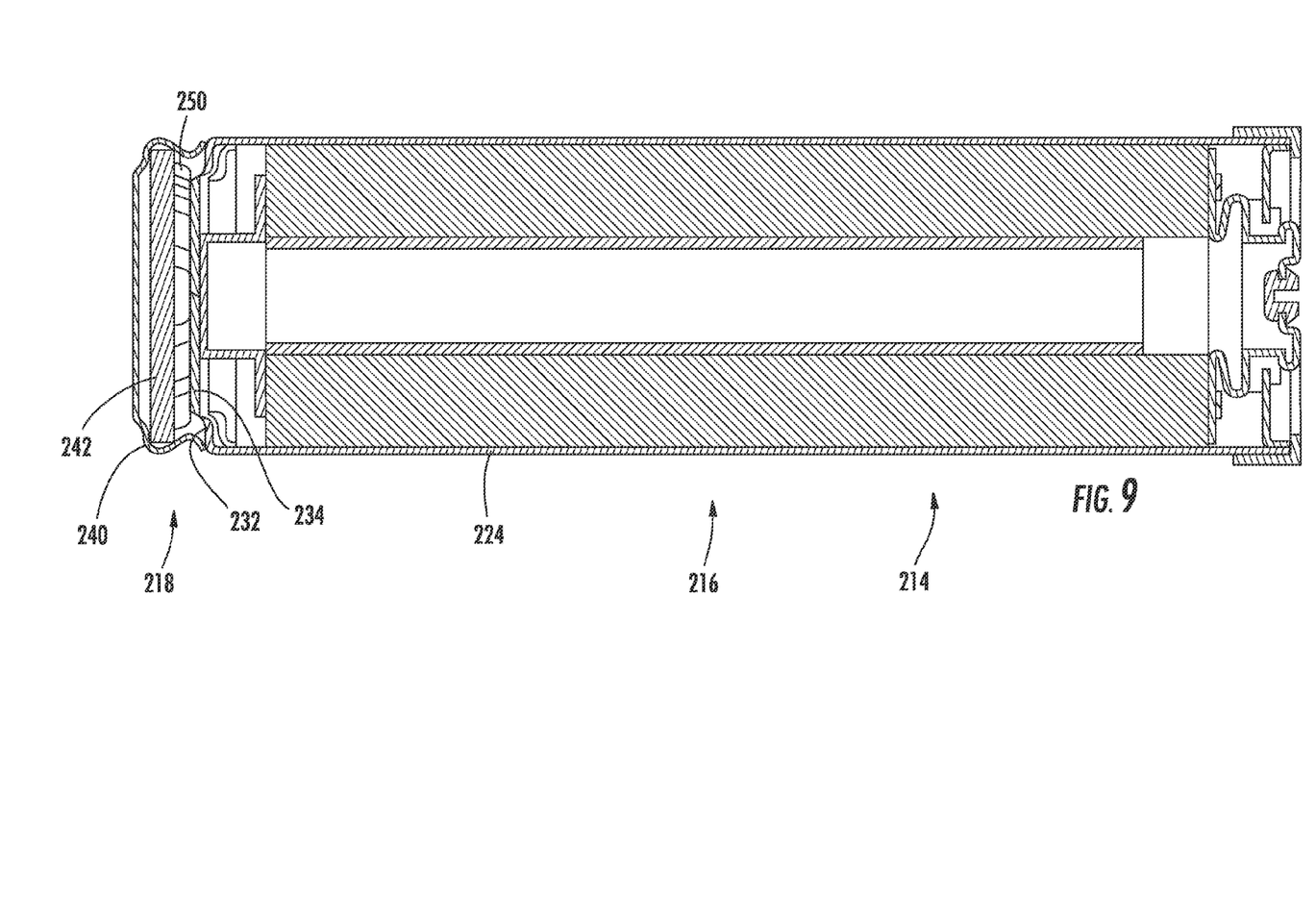
FIG. 9 is a cross-sectional view of a portion of the battery module assembly shown in FIG. 6 according to another exemplary embodiment.

Referring to FIG. 9 and according to another exemplary embodiment, a portion of a battery module 214 is shown, comprising a cell 216 and an end cap 218 that may cooperate to form a single-stage pressure relief system. According to this embodiment, end cap 218 is provided with a conductive portion 240 that comprises a plurality of apertures 250. Vent 234 is configured to break away from an end wall 232 at a predetermined pressure greater than the normal operating pressure but below a pressure that would rupture body 224. When vent 234 is deployed, electrical current through battery module 214 is halted and any gases within cell 216 are allowed to escape into the atmosphere through apertures 250. Insulating portion 242 of end cap 218 is shown as a generally planar member and is configured to at least partially absorb the momentum of vent 234 as it moves away from body 224 and substantially prevent vent 234 from bouncing off end cap 218 and reestablishing a conductive path with end wall 232.

The construction and arrangement of the elements of the battery module as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g., materials for formation of the conductive and insulating components, technology for the internal components of the cell, the shape of the cells, etc.). For example, elements shown as integrally formed may be constructed of multiple parts or elements, the position of elements may be reversed or otherwise varied, and the nature or number of discrete elements or positions may be altered or varied. It should be noted that the elements and/or assemblies of the battery module may be constructed from any of a wide variety of materials that provide sufficient strength or durability (such as aluminum, steel, copper) in any of a wide variety of colors, combinations and suitable materials. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. A battery module comprising:
    a plurality of electrochemical cells, at least one of the electrochemical cells comprising:
        a first terminal conductively coupled to a first electrode;
        a body portion configured to function as a second terminal and conductively coupled to a second electrode via a pressure relief portion; and
        an end cap comprising a conductive portion and an insulating portion, the conductive portion being conductively coupled to the body portion;
    wherein the body portion includes an end wall comprising the pressure relief portion and a sidewall extending from the end wall that at least partially surrounds and contains the first electrode, the second electrode, and an electrolyte;
    wherein the pressure relief portion is configured to separate from the body portion to a deployed position when a pressure within the body portion reaches a first predetermined level, thereby substantially breaking the conductive coupling between the body portion and the second electrode; and
    wherein the insulating portion substantially prevents formation of a conductive coupling between the body portion and the second electrode when the pressure relief portion is in the deployed position.

2. The battery module of claim 1 wherein the end cap is also conductively coupled to a first terminal of a second electrochemical cell, wherein the end cap is configured to remain in contact with the first electrochemical cell and the second electrochemical cell when the pressure relief portion is in the deployed position.

3. The battery module of claim 1 further comprising a second pressure relief portion coupled to the body portion and configured to separate from the body portion to a deployed position when a pressure within the body portion reaches a second predetermined level higher than the first predetermined level, thereby permitting fluids to escape from the body portion.

4. The battery module of claim 3 wherein the second pressure relief portion comprises a weakened portion configured to permit the second pressure relief portion to deploy when the pressure within the body portion reaches the second predetermined level.

5. The battery module of claim 3 wherein the first predetermined level is approximately 5 bars and the second predetermined level is approximately 10 bars.

6. The battery module of claim 1 wherein the end wall of the body portion comprises a center portion that acts as the pressure relief portion.

7. The battery module of claim 6 wherein the pressure relief portion is coupled to the end wall by a weakened portion.

8. The battery module of claim 7 wherein the weakened portion comprises an area of reduced material thickness.

9. The battery module of claim 1 wherein the end cap is configured to contain the pressure relief portion while the pressure relief portion is in the deployed position.

10. The battery module of claim 9 wherein the end cap comprises at least one aperture configured to permit fluids to escape from the body portion when the pressure relief portion is in the deployed position.

11. The battery module of claim 1 wherein the insulating portion of the end cap comprises a non-conductive and shock absorbing material to at least partially absorb the momentum of the pressure relief portion after the pressure relief portion deploys from the body portion such that the pressure relief portion does not bounce off the end cap and re-establish contact with the body portion.

12. The battery module of claim 1 wherein the insulating portion substantially conforms to the interior of the conductive portion.

13. The battery module of claim 1 wherein the insulating portion is a generally flat member.

14. The battery module of claim 1 wherein the insulating portion comprises polypropylene and the conductive portion comprises aluminum.

15. The battery module of claim 1 further comprising a wound electrode roll contained within the body portion, wherein the first terminal is coupled to a first end of the wound electrode element and the second terminal is coupled to a second end of the wound electrode roll.

16. The battery module of claim 3 wherein the body portion includes a first end generally opposite a second end, the first pressure relief portion being at the first end and the second pressure relief portion being at the second end.

17. The battery module of claim 1 wherein the body portion is a generally hollow cylindrical structure.

* * * * *